United States Patent [19]
Bisbee et al.

[11] Patent Number: 5,748,738
[45] Date of Patent: May 5, 1998

[54] SYSTEM AND METHOD FOR ELECTRONIC TRANSMISSION, STORAGE AND RETRIEVAL OF AUTHENTICATED DOCUMENTS

[75] Inventors: Stephen F. Bisbee, Gibson Island; Jack J. Moskowitz, Ellicott City; Edward R. Sheehan, Sykesville; Douglas H. Trotter; Michael W. White, both of Baltimore, all of Md.

[73] Assignee: Document Authentication Systems, Inc., Dallas, Tex.

[21] Appl. No.: 528,841

[22] Filed: Sep. 15, 1995

Related U.S. Application Data

[63] Continuation-in-part of Ser. No. 373,944, Jan. 17, 1995, Pat. No. 5,615,268.

[51] Int. Cl.$^6$ .................................................. H04L 9/00
[52] U.S. Cl. ............................................. 380/25; 380/30
[58] Field of Search ............................................. 380/25, 30

[56] References Cited

U.S. PATENT DOCUMENTS

| | | |
|---|---|---|
| Re. 34,954 | 5/1995 | Haber et al. . |
| 4,200,770 | 4/1980 | Hellman et al. . |
| 4,405,829 | 9/1983 | Rivest et al. . |
| 4,625,076 | 11/1986 | Okamoto et al. . |
| 4,853,961 | 8/1989 | Pastor . |
| 4,893,338 | 1/1990 | Pastor . |
| 4,981,370 | 1/1991 | Dziewit et al. . |
| 4,995,082 | 2/1991 | Schnorr . |
| 5,005,200 | 4/1991 | Fischer .................... 380/30 |
| 5,136,646 | 8/1992 | Haber et al. . |
| 5,136,647 | 8/1992 | Haber et al. . |
| 5,163,091 | 11/1992 | Graziano et al. . |
| 5,164,988 | 11/1992 | Matyas et al. ............ 380/25 |
| 5,191,613 | 3/1993 | Graziano et al. . |
| 5,214,703 | 5/1993 | Massey et al. . |
| 5,231,668 | 7/1993 | Kravitz ....................... 380/30 |
| 5,276,737 | 1/1994 | Micali . |
| 5,315,658 | 5/1994 | Micali . |
| 5,323,146 | 6/1994 | Glaschick . |
| 5,339,361 | 8/1994 | Schwalm et al. . |
| 5,363,448 | 11/1994 | Koopman, Jr. et al. . |

(List continued on next page.)

OTHER PUBLICATIONS

CCITT Draft Recommendation X.411, Ver. 4e, §§ 8.3.1.1.2.2 and 8.3.1.1.2.3 (Jun. 1987).

Request for Comments 1114, "Privacy Enhancement for Internet Electronic Mail: Part II—Certificate–Based Key Management", IAB Privacy Task Force (Aug. 1989).

G.F. Hice et al., *DMS Prologue to the Government E–Mail Revolution*, J.G. Van Dyke & Associates, Inc., chapt. 3 (1995).

(List continued on next page.)

*Primary Examiner*—Salvatore Cangialosi
*Attorney, Agent, or Firm*—Burns, Doane, Swecker & Mathis, LLP

[57] ABSTRACT

Methods and apparatus are provided that implement digital signing and/or encryption for the electronic transmission, storage, and retrieval of authenticated documents and that enable the establishment of the identity of the originator of an electronic document and of the integrity of the information contained in such a document. Together these provide irrevocable proof of authenticity of the document. The methods and apparatus make it possible to provide "paperless" commercial transactions, such as real-estate transactions and the financial transactions secured by real estate. A Certification Authority provides tools for initializing and managing the cryptographic material required to sign and seal electronic documents. An Authentication Center provides "third party" verification that a document is executed and transmitted by the document's originator. The methods and apparatus eliminate the need for "hard copies" of original documents as well as hard-copy storage. Retrieval of an authenticated document from the Authentication Center may be done by any number of authorized parties at any time by on-line capability.

16 Claims, 10 Drawing Sheets

U.S. PATENT DOCUMENTS

| | | | |
|---|---|---|---|
| 5,371,794 | 12/1994 | Diffie et al. | 380/30 |
| 5,373,561 | 12/1994 | Haber et al. | 380/25 |
| 5,377,270 | 12/1994 | Koopman, Jr. et al. | |
| 5,390,247 | 2/1995 | Fischer | 380/30 |
| 5,524,073 | 6/1996 | Stambler . | |
| 5,534,855 | 7/1996 | Shockley et al. | 380/25 |
| 5,555,307 | 9/1996 | LeCorre et al. . | |

OTHER PUBLICATIONS

D. Chaum, "Achieving Electronic Privacy", *Scientific American*, vol. 247, No. 8, pp. 96–101 (Aug. 1992).

W. Diffie et al., "Privacy and Authentication: An Introduction to Cryptography", *Proc. IEEE* vol. 67, pp. 397–427 (Mar. 1979).

W. Diffie, "The First Ten Years of Public–Key Cryptography", *Proceedings of the IEEE*, vol. 76, pp. 560–577 (May 1988).

M.E. Hellman, "The Mathematics of Public–Key Crytography", *Scientific American*, vol. 234, No. 8, pp. 146–152, 154–157 (Aug. 1979).

C.R. Merrill, "Cryptography for Commerce—Beyond Clipper", *The Data Law Report*, vol. 2, No. 2, pp. 1, 4–11 (Sep. 1994).

L. Nadile, "Service Notarizes Electronic Documents", *PC Week*, pp. 29, 36 (Jan. 16, 1995).

R.L. Rivest et al., "A Method for Obtaining Digital Signatures and Public–Key Cryptosystems," *Communications of the ACM*, vol. 21, pp. 120–126 (Feb. 1978).

C.E. Shannon, "Communication Theory of Secrecy Systems", *Bell Sys. Tech. J.* vol. 28, pp. 656–715 (Oct. 1949).

LIABILITY ALLOCATION USING PCM/CIA CARD AND DES

FIG. 2

| PCCard | Terminal Software | DAS Services |
|---|---|---|
| *Tamperproof cryptography*<br>*Provides cryptographic processing for:*<br>PIN - Card activation & exposure of secret cryptographic materials<br>Key Exchange<br>Key Set Management of encryption, hash, and signature keys<br>*Stores:*<br>Card Characterization Information<br>Certificates & Keys<br>Software macros<br>Attribute tables | Card Resource Manager<br>Participates in Card authentication & activation<br>Format data & perform I/O operations with Card<br>Requests Card services | PIN validation<br>Compute integrity value<br>Sign<br>Authenticate Signature<br>Validate Integrity<br>Time-Stamp<br>Encrypt/ decrypt<br>Manage keys<br>Store Audit Trail & Liability Allocation |

DAS ARCHITECTURE

MPC - Multiport Controller
PCR - PCM/CIA Card Reader
 *   - 486/50 Laptop Computers
       may be utilized

FIG. 4

DAS FUNCTIONAL INTERRELATIONSHIP

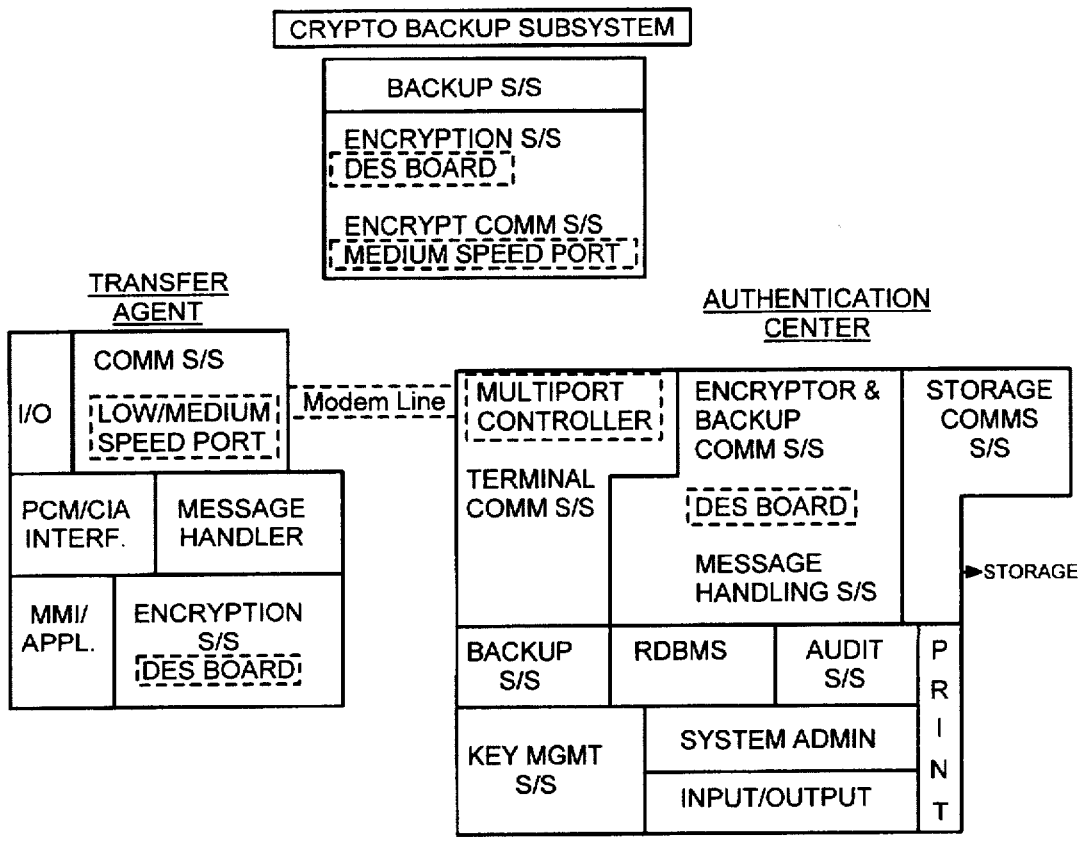

TERMINAL SUBSYSTEM

Terminal: 486/50 PC
MS/DOS
Windows

Running Agent Application
with transparent secure
communications

SERVER SUBSYSTEM

Server: 486/50 System Pro
UNIX

Built Around Powerful
multiuser RDBMS,
supporting multiple
terminal communications
with complete audit and
administration Crypto Host: 486/50 PC
MS/DOS
Provides Encryption

FIG. 5

DAS CONTROL FUNCTIONS

| Control Functions | | | | |
|---|---|---|---|---|
| Confidentiality | Integrity | Non-repudiation (Signature) | | Management Limits on User |
| | | User | Authentication System | |
| Public key encryption of PIN and Keying Material | Digital Signature provides integrity protection. | Digital sign. of user/customer "signs" the transactions in a manner that cannot repudiated. | Digital Sign. of AC "signs" the transactions in a manner that cannot be repudiated. | Limits for user profile stored on PCM/CIA card |
| | | | Integrity Block | |
| DES encryption of transactions. | | | Date and time stamp | PIN and PCM/CIA card authentication to terminal and DAS system |

DOCUMENT AUTHENTICATION SYSTEM LOAN TRANSACTION

FIG. 6b

DOCUMENT AUTHENTICATION SYSTEM
LOAN TRANSACTION

Chart Steps

Step 1. Complete Certification Authority code generation and card issuing to parties transferring the documents establishing legal evidence trail. Equip parties to transmit and receive documents Step 2. Bank/ Mortgage Co. loads and electronically transmits documents to Authentication Center which forwards to Title Co./Closing Agent Step 3. Authentication Center transmits documents to Title Co./Closing Agent Step 4. Title Co./Closing Agent has documents executed by digital signature by Homebuyer/Homeowner Step 5. Title Co./Closing Agent provides Homeowner/ Homebuyer with "Hard Copy" of signed documents Step 6. Title Co./Closing Agent transmits documents to Authentication Center which dates and time stamps the executed documents and forwards documents to Bank/Mortgage Co.

- Whenever Bank/Mortgage Co. needs authentic documents, can retrieve on-line from Authentication Center storage Step 7. Bank/Mortgage Co. directs authentic documents to be transferred by Authentication Authority to secondary market investor Step 8. Whenever investor needs authentic documents, can retrieve on-line from Authentication Center

CARICATURE OF X.509 CERTIFICATE
USER OR CERTIFICATION AUTHORITY

| IDENTITY | ATTRIBUTES | PUBLIC KEY | SIGNATURE VALUE |
|---|---|---|---|
| Name/Organization | Various Privileges | Decrypt Info | Digitally Signed Message Digest of Certificate |

Evidence Trail Established

Establishes Identity of the Party that Generates Digital Signature

SYSTEM AND METHOD FOR ELECTRONIC TRANSMISSION, STORAGE AND RETRIEVAL OF AUTHENTICATED DOCUMENTS

This application is a continuation-in-part of U.S. patent application Ser. No. 08/373,944 filed Jan. 17, 1995, now U.S. Pat. No. 5,615,268 by Stephen F. Bisbee.

BACKGROUND

Applicant's invention relates to systems and methods for providing a verifiable chain of evidence and security for the transfer and retrieval of documents in digital formats.

Paper documents are the traditional evidence of the communications and agreements between parties in commercial and other transactions. Financial and real-estate transactions are protected by paper-based controls. Signatures and safety paper (such as pre-printed checks) facilitate detection of unauthorized alterations of the information of commercial transactions. Important documents may also be provided with "third man" controls, by the witnessing of signatures and by the seal and acknowledgement of a Notary Public.

The methods of commerce, however, have changed dramatically and continue to evolve. This is most evident in the replacement of paper-based communications with electronic communications. The "due care" controls used with paper-based communications do not exist in routine electronic transactions. Standard electronic communication over open systems does not have the same ability to provide authentication, privacy, and integrity of the communicated information. By "authentication" is meant verification of the identity of the signatory of a document; by "privacy" is meant protection of the information in a document from unauthorized disclosure; and by "integrity" is meant the ability to detect any alteration of the contents of a document.

When communication is by electronically reproduced messages such as e-mail, facsimile machine, imaging, electronic data interchange or electronic fund transfer, there no longer exists a signature or seal to authenticate the identity of the transferor. The traditional legally accepted methods of verifying the identity of a document's originator, such as physical presence or appearance, an ink signature, personal witness or Notary Public acknowledgement, are not possible.

The continued evolution of computer and telecommunications technology has regretfully been accompanied by the invention of more sophisticated ways to intercept and alter information electronically transmitted, including the widespread phenomenon of remote intrusion of computer systems through telecommunication links.

Some approaches to providing secure electronic commerce technology by applying cryptography give the user a verification mechanism for the authenticity or privacy of the transmission that is controlled by the user and does not include the element of non-repudiation. In some cases the use of encryption for privacy could aid in the detection of document alterations, advancing the goal of integrity. This is not generally the case, however, and additional mechanisms may be required for providing integrity. At present, no distributed electronic document authentication system exists that can provide authentication, as with written or printed instruments, in a manner that cannot be repudiated. No commercial system provides electronic document verification based on a digital signature that cannot be repudiated, although some attempts have been described. See, e.g., D. Chaum, "Achieving Electronic Privacy", *Scientific American*, vol. 247, no. 8, pp. 96–101 (Aug. 1992); C. R. Merrill, "Cryptography for Commerce - Beyond Clipper", *The Data Law Report*, vol. 2, no. 2, pp. 1, 4–11 (Sep. 1994). Since DES, no governmental organization or other standards-setting body has been willing or able to set standards (i.e., as to cryptographic strength, process, etc.) acceptable for general commercial use. The techniques described in this application are synergistic and of sufficient assurance to be on par with the security needed to support a typical business transaction.

Applicant's document authentication system (DAS) provides the needed security and protection of electronic transmissions, such as electronic documents. Most important to commercial and financial institutions, Applicant's DAS assumes the risk and responsibility of a document's authenticity. Applicant's DAS utilizes an asymmetric cryptosystem, known as a public-key system, to help ensure that the party originating a document is electronically identifiable as such when a DAS digital signature is applied.

Various aspects of public-key cryptographic (PKC) systems are described in the literature, including R. L. Rivest et al., "A Method for Obtaining Digital Signatures and Public-Key Cryptosystems," *Communications of the ACM* Vol. 21, pp. 120–126 (Feb. 1978); M. E. Hellman, "The Mathematics of Public-Key Cryptography", *Scientific American*, vol. 234, no. 8, pp. 146–152, 154–157 (Aug. 1979); and W. Diffie, "The First Ten Years of Public-Key Cryptography", *Proceedings of the IEEE*, vol. 76, pp. 560–577 (May 1988). Popular PKC systems make use of the fact that finding large prime numbers is computationally easy but factoring the products of two large prime numbers is computationally difficult. A PKC system is an asymmetric encryption system, meaning that it employs two keys, one for encryption and one for decryption. Asymmetric systems adhere to the principle that knowledge of one key (the public key) does not permit derivation of the second key (the private key). Thus, PKC permits the user's public key to be posted (e.g., in a directory or on a bulletin board), without compromising his/her private key. This public key concept simplifies the key distribution process. Example PKC algorithms are the digital signature algorithm and secure hash algorithm (DSA/SHA) and RSA/MD5.

Besides the PKC method, another encryption method is the symmetric algorithm. An example of this is the Data Encryption Standard (DES), which is described in *Data Encryption Standard*, Federal Information Processing Standards Publication 46 (1977) ("FIPS PUB 46", republished as FIPS PUB 46-1 (1988) and *DES Modes of Operation*, FIPS PUB 81 (1980) that are available from the U.S. Department of Commerce. In general, a symmetric cryptographic system is a set of instructions, implemented in either hardware, software or both that can convert plaintext (the unencrypted information) to ciphertext, or vice versa, in a variety of ways, using a specific key that is known to the users but is kept secret from others.

For either a symmetric or PKC system, the security of a message is dependent to a great extent on the length of the key, as described in C. E. Shannon, "Communication Theory of Secrecy Systems", *Bell Sys. Tech. J.* vol. 28, pp. 656–715 (Oct. 1949).

SUMMARY

These and other objects and advantages are provided by the DAS which comprises the means to identify the originator of the electronic document, to provide irrevocable proof of the integrity of an electronic document and the means to prevent the originator of the document from denying the document's originator, i.e., non-repudiation.

In one aspect of Applicant's invention, a method of authenticating an electronic document comprises the steps of: signing the electronic document with a digital signature of a Transfer Agent; appending a certificate to the electronic document by the Transfer Agent; and validating the digital signature and certificate of the Transfer Agent. The certificate may include information representing the Transfer Agent's identity, public cryptographic key, and predetermined attributes.

The signing step may comprise the steps of applying a hash function to the electronic document to determine a message digest and using the message digest with a secret cryptographic key of the Transfer Agent to determine digital signature. The step of validating the digital signature then comprises the steps of decrypting the message digest with the Transfer Agent's public cryptographic key, applying the hash function to the electronic document to determine a second message digest, and comparing the decrypted message digest to the second message digest.

The method may further comprise the step of applying a date stamp and a time stamp to the electronic document. The date and time stamps may be applied either before or after validation of the digital signature and electronic document using the certificate. Also, the method may further comprise the step of signing the electronic document with a second digital signature.

In another aspect of the invention, an apparatus for authenticating an electronic document comprises means for signing the electronic document with a digital signature of a Transfer Agent; means for appending a certificate to the electronic document; and means for validating the digital signature and certificate. The certificate may include information representing the Transfer Agent's identity, public cryptographic key, and predetermined attributes.

The signing means may comprise means for applying a hash function to the electronic document to determine a message digest and means for using the message digest with the Transfer Agent's secret cryptographic key to determine the digital signature. The validating means may then comprise means for decrypting the message digest with a public cryptographic key of the Transfer Agent, means for applying the hash function to the electronic document to determine a second message digest, and means for comparing the decrypted message digest to the second message digest.

The apparatus may further comprise means for applying a date stamp and a time stamp to the electronic document. The date and time stamps may be applied either before or after the digital signature and electronic document have been validated using the certificate. Also, the apparatus may further comprise means for signing the electronic document with a second digital signature.

BRIEF DESCRIPTION OF THE DRAWINGS

The various features and advantages of Applicant's invention will become apparent by reading this description in conjunction with the drawings in which:

FIG. 2 summarizes the functions of the DAS relating to document transmission authorization and protection;

FIG. 4 is a block diagram of the functional interrelationship between a Transfer Agent and an Authentication Center;

FIG. 5 is a block diagram of DAS control functions;

FIGS. 6a, 6b are diagrams illustrating application of the DAS in the mortgage finance industry with a title company/closing agent for a loan as a Transfer Agent;

DETAILED DESCRIPTION

Applicant's invention can be implemented utilizing commercially available computer systems and technology to create an integrated closed system for authentication of electronic documents.

Figure 1:
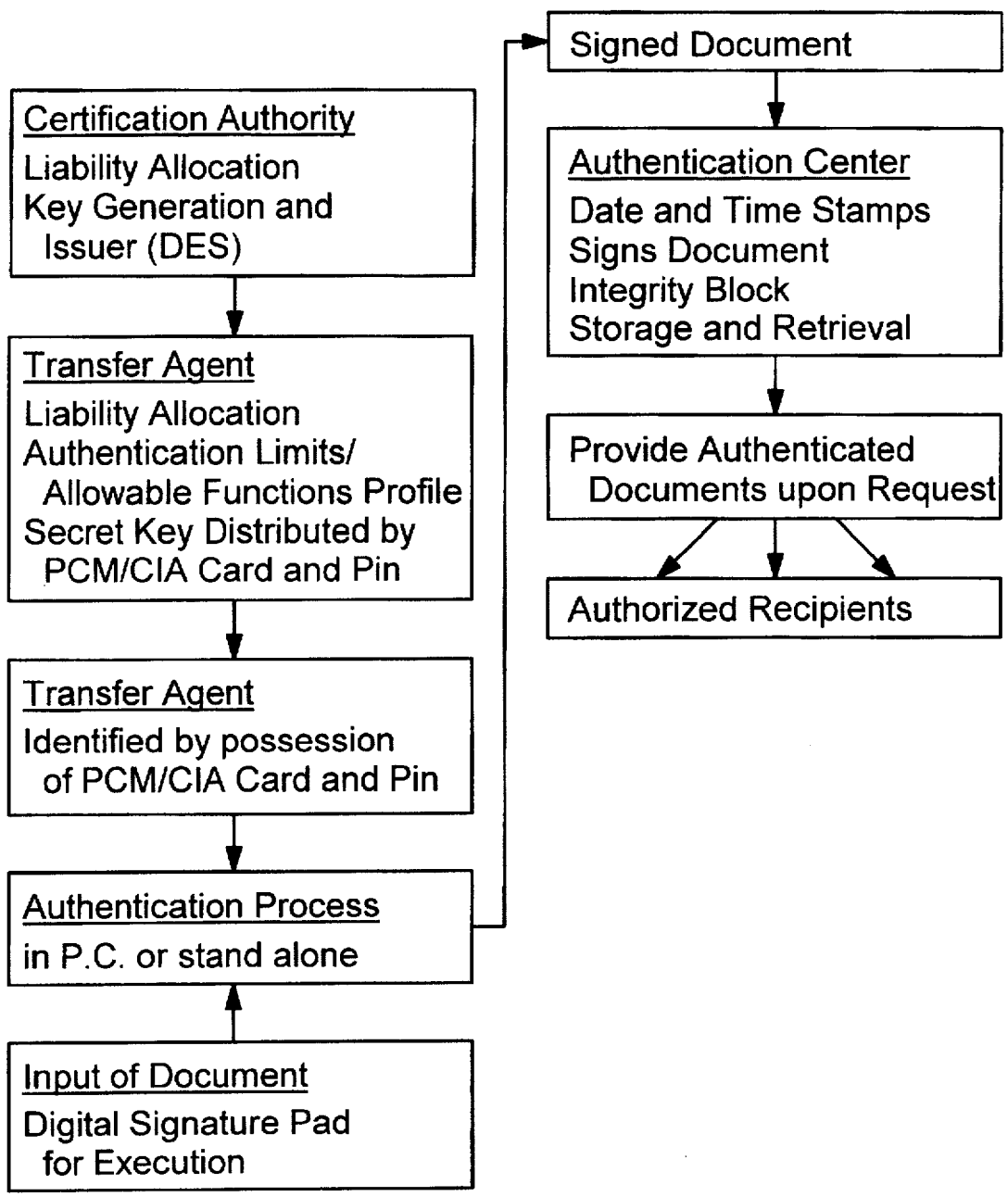
FIG. 1 is a block diagram of the liability allocation for authentication in the DAS.

Referring to FIG. 1, which is a block diagram of the liability allocation for authentication in Applicant's DAS, the DAS uses a Certification Authority framework by which public/private keys, that are utilized to encrypt/decrypt and/or digitally sign a document, are delivered to a document's originator by an established, auditable means. Certificates and certification frameworks are described in the above-cited publication by C. R. Merrill and in ITU-T Recommendation X.509 (1993)|ISO/IEC 9594-8: 1995 Information Technology - Open Systems Interconnection - The Directory: Authentication Framework (including all amendments), which is expressly incorporated here by reference. The infrastructure and certificate definitions used in this application are based on these documents.

As described below, the public/private key is advantageously delivered in the form of a Token such as an electronic circuit card conforming to the standards of the PC Memory Card Interface Association (a PCMCIA card or PC Card) for use in the originator's computer. In general a Token is a portable transfer device that is used for transporting keys, or parts of keys. It will be understood that PC Cards are just one form of delivery mechanism for public/private keys for Applicant's DAS; other kinds of Tokens may also be used, such as floppy diskettes and Smart Cards. To ensure reliable delivery a service such as the bonded courier services commonly used to ferry securities between parties could be used to deliver the media to the document originator.

Advantageously, many commercially available Tokens that embody onboard cryptography generate the public/private key pairs on the cards, and the private keys never leave the cards unencrypted. The public keys are exported to the Certification Authority for inclusion, with the identity of the intended recipient and appropriate user attributes among other things, into a "certificate". Principal components of the DAS system assurance are the correct operation of the Certification Authority framework, the tight binding of user identity and attributes to the public key in the certificate, and the reliable delivery of the Token to the authorized recipient.

In an additional aspect of Applicant's invention, the public/private key is only effective when it is used in conjunction with a certificate and personal identification information such as the recipient's biometric information (e.g., retina-, finger-, and voice-prints) or a personal identification number (PIN) that is assigned to the recipient of the card by the Certification Authority and that may be delivered separate from the originator's card. Any subsequent transmitter of the document who is required to digitally sign or encrypt the document would similarly be provided with a respective card and personal identification information.

In FIG. 1, a document's originator and any subsequent transmitter are called a Transfer Agent, and it will be appreciated that a Transfer Agent is identified to the DAS by its possession and use of a valid certificate and a valid PIN. In issuing the key and PIN to the Transfer Agent, the DAS advantageously records one or more attributes of the Transfer Agent in association with the key and PIN. For example, the Transfer Agent may be authorized to conduct only certain types of transactions and/or transactions having less than a predetermined value.

Issuance by the Certification Authority of a digitally signed certificate ensures the verifiability of the identity of each transmitter of a digitally signed or encrypted document. The Certification Authority also retains the ability to revoke a public/private key, or to reissue a public/private key, from a remote location electronically. The Certification Authority can also support privilege management in accordance with the policy set for the system. For example, the Certification Authority can set financial or other limits on the authority granted to the Transfer Agent by conveying those authorizations or restrictions as certificate attributes. These attributes can be retrieved from the certificate and enforced by other elements in the system.

In an important aspect of Applicant's invention, the DAS is a system for authenticating a document by applying digital signature encryption technology. As used here, "authentication" is the corroboration and verification of the identity of the party which executed, sealed, or transmitted the original document and verification that the encrypted document received is the document sent by that party. The DAS uses an Authentication Center to provide an audit or evidence trail, for applications that require this capability, from the original execution of the executed or encrypted or sealed document through all subsequent transmissions.

The Certification Authority would use a physically secure facility that is a "trusted center" having twenty-four-hour security, an alarm system, and "vaulted" construction. In view of its importance, a facility would advantageously include two-person controls, with no single person having access to key generating or key management systems. All personnel connected with the operations of cryptographic key management and transmission of electronic documents would have their trustworthiness evaluated in the surest ways possible, e.g., personal interviews, background checks, polygraphs, etc. Moreover, the Certification Authority management would implement procedures that prevent single-point failures, requiring collaboration for compromise to take place. In this way, one individual would be prevented from obtaining complete access to key generation and to key management.

Another aspect of Applicant's DAS authentication that is in contrast to prior systems is the utilization of an integrity block and a date and time "stamp" on each transmitted document. Suitable time and date stamps are those provided by systems described in U.S. Pat. No. 5,136,646 and U.S. Pat. No. 5,136,647 to Stuart A. Haber and W. S. Stornetta, Jr., both of which are expressly incorporated here by reference, and commercially available from Surety Technologies, Inc. The integrity block, i.e., the digital signature, and the date and time stamp, which are applied by the Authentication Center, eliminate the possibility of unauthorized alteration or tampering with a document by the signatories subsequent to its original execution or sealing. The Authentication Center's integrity block for a document received from a Transfer Agent is generated using any of several known digital hashing algorithms. This integrity block ensures that the document cannot be altered without detection. In addition, use of the digital signing algorithm by the Authentication Center can advantageously provide for non-repudiation, i.e., precluding the originator from disavowing the document. Applicant's combination of the integrity block, date and time stamp, and audit provide notice and evidence of any attempt at alteration or substitution, even by a document's originator when the alteration is attempted after origination.

In accordance with Applicant's invention, each transaction and its documents are authenticated by transmission to the Authentication Center from the Transfer Agent's terminal. As described below, the Transfer Agent provides the document in digital form, such as the output of a conventional word processor, to the Transfer Agent's Token. As an option, a device for digitizing a hand-written signature may also be provided and the digitized signature may be added to the digital document. The digital document is digitally signed and/or encrypted by the DAS Token, and the digitally signed and/or encrypted version is communicated to the Authentication Center electronically (e.g., by modem or computer network). Other ways of communicating the digitally signed or encrypted documents might be used (for example, dispatching a diskette containing the document), but the great advantage of electronic communication is speed.

The Authentication Center verifies the identity of the Transfer Agent and the authenticity of the documents, and appends a digital signature and a date and time stamp to the document, thereby establishing each transaction in a manner which can not be repudiated. The combination of these functions, in conjunction with a protected audit trail, can be used at a future date to prove conclusively that a party initiated a transaction. In particular, Applicant's invention provides for authentication of a document in a way that prohibits an originator from denying that the document originated with that originator, and provides irrevocable proof of authenticity.

The authenticated, digitally signed and/or encrypted documents are stored by the third-party Authentication Center in any convenient form, such as on optical and/or magnetic disks. Once a transaction is completed and the digitally signed and/or encrypted document or documents are transmitted and authenticated by the Authentication Center, any authorized party can access the Authentication Center through an electronic device such as a modem to obtain or further transmit an authenticated document. All transmissions of electronic documents from the originator are made to the Authentication Center, which provides authentication as described above and stores the authenticated documents for transmission to and on behalf of authorized parties whose identities and policies are similarly authenticated by the Authentication Center. Authorization for access may be restricted to the level of a single document or group of documents.

In accordance with Applicant's invention, the DAS verifies and ensures that documents that have been transmitted, stored, or retrieved have not been accidentally or intentionally modified. The DAS can verify at any stage and at any time that a document is exactly, to the last bit, the document which was executed and transmitted by the originator and that the document has not been altered or impaired in any manner. This element of integrity combined with a digital signature and a date and time stamp enable the DAS to ensure that a document is not a fabrication, forgery, impersonation, or unauthorized replacement of a document originally executed or sealed by the document's originator.

Since originators of documents to be signed and/or encrypted, such as loan and mortgage documents, commercial paper and other securities, property deeds and leases, etc., should be able to execute their transactions from a variety of locations, the DAS moves the heart of the cryptographic process to a Token entrusted to a respective authorized Transfer Agent. This permits individual utilization of any DAS enabled computer in any location that is networked or connected with the Authentication Center. As described above, the cryptographic cards and certificates are issued and monitored by the Certification Authority. Certificates are further controlled through the inclusion of an "expiration period" field, which enables the periodic replacement if desired of the Transfer Agent certificates. It will be appreciated that certificates in accordance with X.509 include a plurality of such fields, but only those fields important to understanding the operation of the invention are described here.

Figure 3:
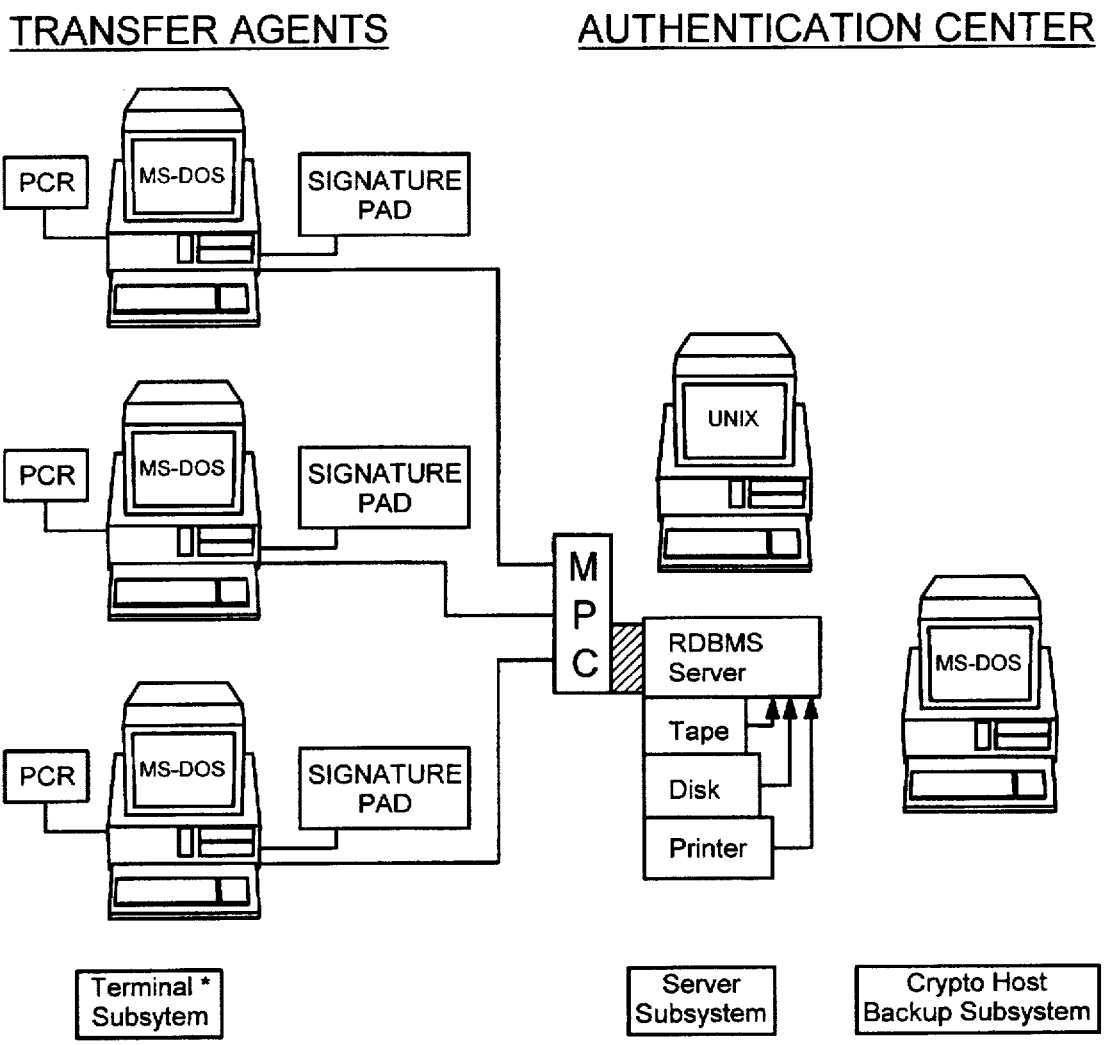
FIG. 3 is a simple diagram of the DAS architecture.

FIG. 2 summarizes the functions of the DAS relating to document transmission authorization and protection. In the left column are the functions of a Transfer Agent's Token; in the center column are other functions carried out by the Transfer Agent's transmission device; and in the right column are functions of the DAS. FIG. 3 is a diagram illustrating interconnections among three Transfer Agent terminals and a server subsystem and backup subsystem in the Authentication Center in the DAS architecture. FIG. 4 is a block diagram of the functional interrelationship between a Transfer Agent and the Authentication Center.

The cryptographic card includes components, such as a microprocessor and electronic memory devices, for carrying out the steps of a PKC algorithm as well as a symmetric encryption algorithm such as DES. Also, the card should be tamper-proof, which can be assured by designing it to delete critical keys and/or algorithms upon any attempted penetration or alteration. The National Institute of Standards and Technology has been chartered to certify the authentication implementation of the cryptographic card suppliers that may be used by the DAS.

In accordance with Applicant's invention, each transaction and its documents are authenticated using a public key contained in the Transfer Agent's certificate. Privacy, signature, and/or integrity devices and software are commercially available from a number of sources, including RSA Data Security, Inc.; Public Key Partners; Surety Technologies, Inc.; Ascom Tech AG, Switzerland; National Semiconductor; Northern Telecom Ltd.; and Spyrus.

The Authentication Center makes use of its own secret key to sign again the transaction in a manner that cannot be repudiated. The combination of the Transfer Agent's and Authentication Center's signatures (in conjunction with the physically protected audit trail) can be used at a future date to prove conclusively that an agent, employee, or firm (the Transfer Agent) initiated a specific transaction. In addition, a Notary Public support function is available for implementation as described below.

Employee or agent sign-on at the Transfer Agent's terminal is protected by the personal identification information and the cryptographic features of the cryptographic card held by that Transfer Agent. The combination of these controls uniquely identifies the agent or employee, thereby enabling DAS. In addition, agent or employee authorization and attribute information may be stored in the certificates or Token memory in protected or sealed form as described above. The DAS uses this information in conjunction with the PIN to set privilege, access, volume and fund amount limits.

The DAS provides a distributed validation capability using a "signature" that cannot be repudiated. The strategy uses PKC to reduce the key management overhead and to provide a digital signature that cannot be repudiated for all documents and transactions. Encryption is used to provide confidentiality protection of the PIN and other transaction details as described above. These control functions of the DAS are summarized in FIG. 5.

Additionally, the DAS is compatible with the full range of modern distributed, and client/server transactional based applications. It operates effectively in LAN, WAN, and dial-up networks. The DAS preferably utilizes modern database tools, and thus the server can advantageously utilize relational technology with a SQL interface (e.g., SYBASE).

As illustrated in FIG. 4, the originator of an electronic document or other Transfer Agent may implement the DAS with a typical 486 desktop or laptop computer having the DAS encryption subsystem (Token) installed and optionally an electronic digital signature pad for hand-signed "execution" of the document. It is not required for the function of the DAS to have a hand-signed instrument since a digital signature on the document is sufficient. However, at this time, a typical party in loan or other commercial transactions requires the comfort of receiving laser-printed copies of documents which have been executed by hand. Other components and software typically provided in the Transfer Agent terminal are a communication subsystem for handling transmission of encrypted or digitally signed documents to the Authentication Center by a modem telephone line or other suitable communication link, a Token interface, a message handler, input/output interface, and multimessage input application.

The Authentication Center is advantageously organized as a server subsystem, a crypto backup subsystem, and storage. As part of the server subsystem, which may be implemented with a 486 computer running under a UNIX-type operating system, a terminal communication subsystem includes a multiport controller (see also FIG. 3) that handles communications with the Transfer Agent terminals. Also provided in the server subsystem are a cryptographic key management subsystem, a backup subsystem, a relational database management system, input/output (I/O), system administration, and audit subsystem. A Token Card and backup communication subsystem interfaces with the backup subsystem mentioned above that may be implemented as a 486 computer running under a DOS-type operating system. A storage communication subsystem interfaces with the document storage device or devices mentioned above.

The DAS also would permit a "Notary Public" type of secondary support function. This would permit a third party present at the document's execution to also have a cryptographic card which would "seal" the transaction for further verification that the parties executing or sealing the document to be signed were in fact the proper parties. This additional notary function is not required, but would assist in the further authentication of the identities of the parties.

Figure 6A:
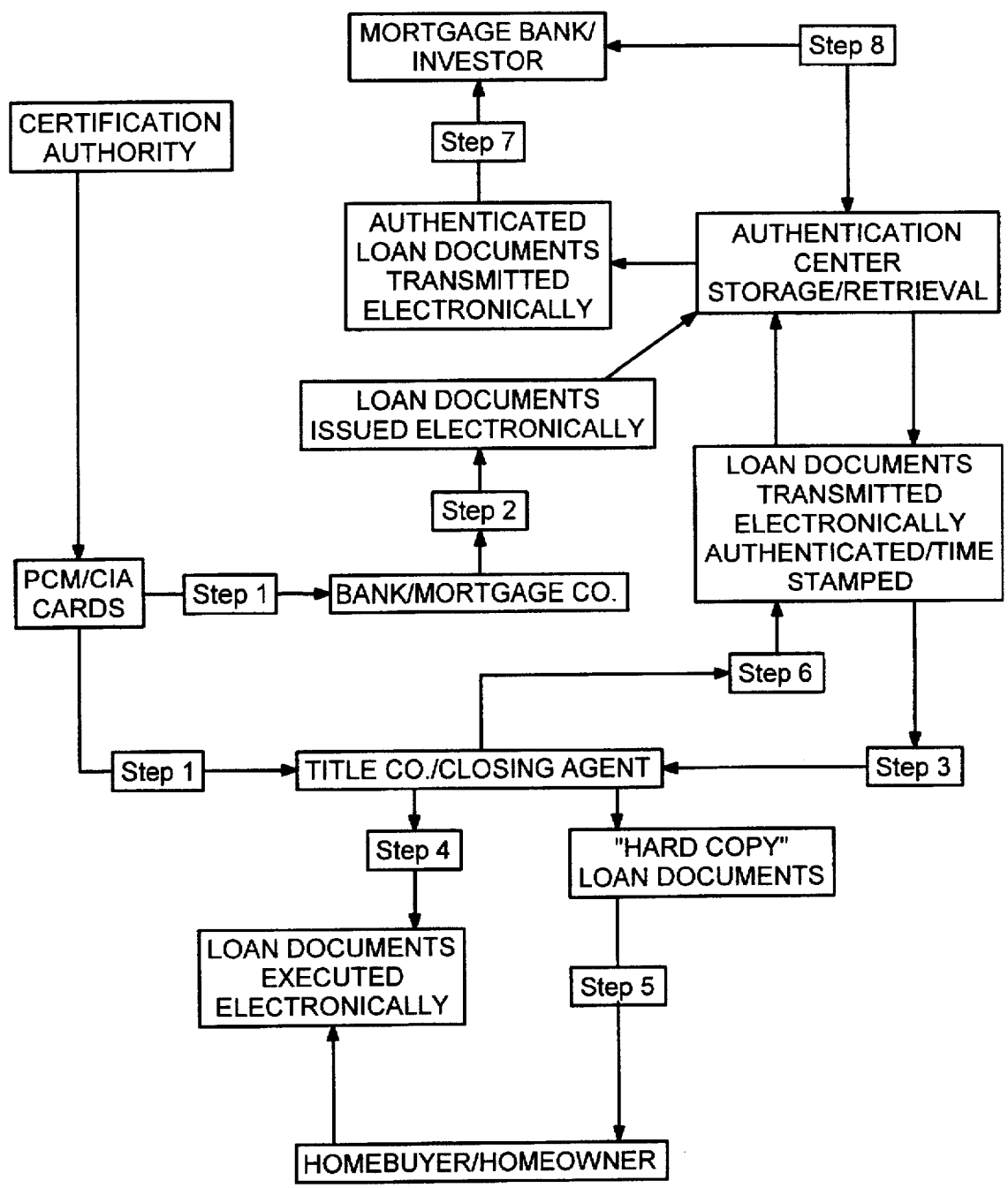

FIGS. 6a, 6b are diagrams illustrating a typical application of the DAS in the mortgage finance industry with a title company/closing agent for the loan as a Transfer Agent. In step 1, the Certification Authority completes code generation and issues Tokens to authorized parties for transferring documents and establishing legal evidence trails. The parties, who would generally not be individuals but commercial and financial institutions such as a BANK/Mortgage Co. and a Title Co./Closing Agent, would be equipped to transmit and receive documents electronically. In step 2, a Bank/Mortgage Co. loads and electronically transmits loan documents to the Authentication Center, which forwards them to a Title Co./Closing Agent after adding integrity blocks and date and time stamps. In step 3, the Authentication Center transmits the authenticated loan documents to the Title Co./Closing Agent.

In step 4, the Title Co./Closing Agent has the documents executed by digitized autograph signature by a Homebuyer/Homeowner. In step 5, the Title Co./Closing Agent provides Homeowner/Homebuyer with "hard copies" of the signed documents. In step 6, the Title Co./Closing Agent transmits the documents to the Authentication Center, which adds the integrity blocks and dates and time stamps the executed documents, forwards the documents to the Bank/Mortgage Co., and stores the documents. Whenever the Bank/Mortgage Co. needs copies of the authentic documents, they can be retrieved on-line from Authentication Center storage.

In step 7, the Bank/Mortgage Co. directs that the authentic documents be transferred by the Authentication Center to a secondary-market Mortgage Bank/Investor. In step 8, whenever the Investor needs authentic documents, they can be retrieved on-line from the Authentication Center.

Figure 7:
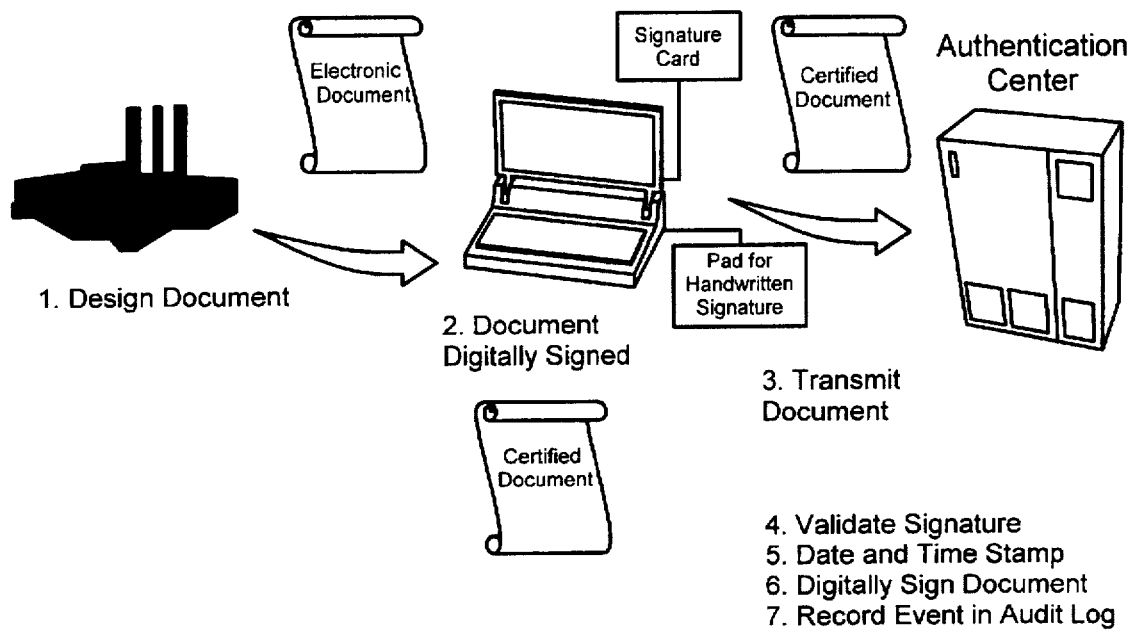
FIG. 7 illustrates the document certification process more generally.

FIG. 7 further illustrates an example of Applicant's document certification process. In the first step, an electronic document is designed, or drafted, that reflects the agreement of parties, such as a manufacturing operation depicted by the factory in FIG. 7. The electronic document is provided to a Transfer Agent's terminal, which is illustrated as a portable computer having an authorized Token and, optionally, a stylus pad for capturing hand-written signatures. A typical configuration for a Transfer Agent's terminal is at least the computational equivalent of a 386 desktop or laptop computer, with high resolution graphics, a Token reader, and a stylus pad for capturing hand-written signatures. As shown in FIG. 7, the electronic document, which may be created locally or remotely, is displayed on this terminal.

In the second step, the parties to the agreement execute their hand-written signatures on the document using the stylus pad. These signatures are captured and inserted in appropriate locations in the electronic document. After all parties have signed the document, the Transfer Agent certifies the completion of the document's execution by invoking his or her digital signature and appending his or her certificate, using the Token.

If an original paper document were desired, the electronic document would be printed first. The paper document would then be placed on the stylus pad and the terminal's cursor positioned to the corresponding place in the electronic document. This permits the capture and transfer of hand-written signatures during the actual signing of the paper document. The electronic version is then an exact duplicate of the paper document.

After local certification, the Transfer Agent transmits the electronic document to the Authentication Center in the third step of the process. The Authentication Center preferably includes a high-volume utility server computer, having substantial storage capacity and backup capability, and is a secure and highly assured facility. The Authentication Center contains a separate digital signature capability, one or more Tokens, and an accurate time base.

When an electronic document is received, the authenticity and rights of the Transfer Agent are validated by the Authentication Center (step 4). If authenticated, the electronic document is time- and date-stamped (step 5), digitally signed (step 6), journaled (step 7), and stored by the Authentication Center. Certified copies of the electronic document may then be distributed according to instructions from an appropriate party, such as the holder of a beneficial interest (owner) designated by the document.

The Authentication Center maintains the electronic document and a log, or history, of all transactions, such as requests for copies, etc., related to it. It will be appreciated that the log is useful for many management functions that contribute to the usefulness of the system. For example, the log facilitates identifying subsequent electronic submissions related to a transaction and contributes to liability limitation for the Authentication Center. Also, the log is useful as evidence of the document's chain of custody.

The Authentication Center also controls access to the document in accordance with authorization instructions provided by the owner of the document. Such authorization instructions would be updated or revised in conformance with changes (e.g., assignments) in the document's ownership.

Figure 8:
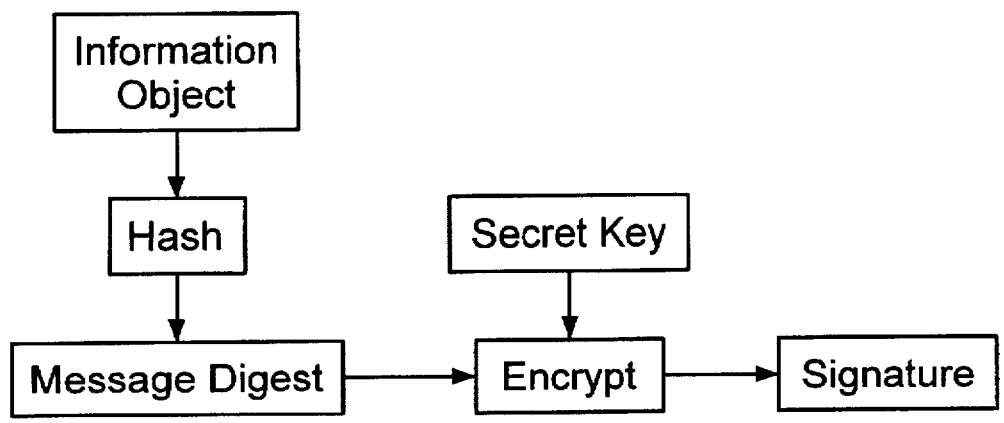
FIG. 8 illustrates generation of a digital signature.

FIG. 8 illustrates the process of digitally signing an electronic document, depicted more generally as an "information object", by application of a hash function. In general, a hash function is a truly one-way cryptographic function that is computed over the length of the information object to be protected. The hash function produces a "message digest" in a way such that no two different information objects produce the same message digest. Since a different message digest is produced if even one bit of the information object is changed, the hash function is a strong integrity check.

In accordance with the invention, the message digest is encrypted using the signatory's secret key, thereby producing the signatory's digital signature. The combination of hashing and encryption in this way insures the system's integrity (i.e., the ability to detect modification) and attribution capability (i.e., ability to identify a signatory, or responsible party). The digital signature (the encrypted message digest) is appended to the readable information object (see steps 2 and 6 depicted in FIG. 7).

Of the many different hash functions that are known, it is currently believed that those designated MD4 and MD5, which are embodied in circuits commercially available from vendors identified above, and the U.S. government's published secure hash algorithm are suitably robust for use in Applicant's DAS. Of course, other hash functions can be expected to become available as time passes.

Figures 9, 10:
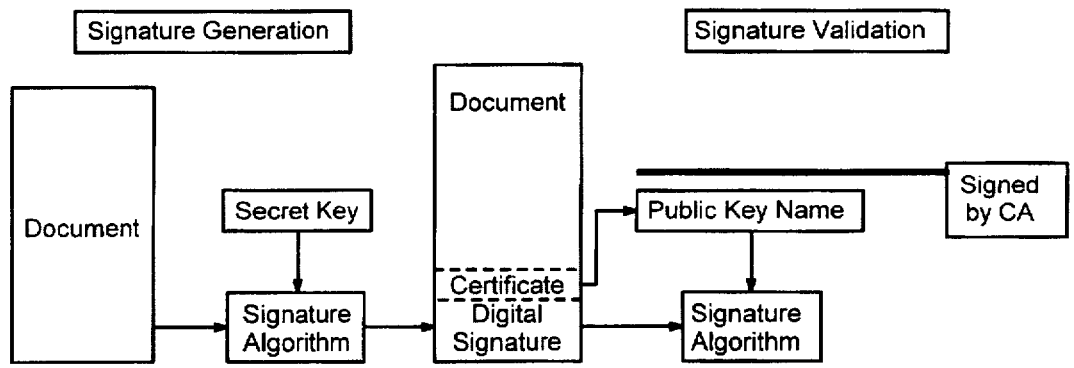
FIG. 9 illustrates digitally signing a document and validation of the digital signature.
FIG. 10 illustrates the format of a certificate employed by a user or the Certification Authority.

The steps of digitally signing an electronic document (steps 2 and 6 depicted in FIG. 7) and validating the digital signatures (step 4 in FIG. 7) are further illustrated in FIG. 9. The electronic document has appended to it one or more digital signatures, which are created by using a signature algorithm and the secret key(s) of the signatory(s) as described in connection with FIG. 8, and the certificate(s) of the signatory(s). As described above, each such certificate conveys the identity of the signatory, the signatory's public signature/verification key, predetermined collateral information about the signatory, and the digitally signed message digest of the certificate. The format of these pertinent parts of such a certificate in accordance with the X.509 Recommendation that would be employed by a user or the Certification Authority is illustrated in FIG. 10.

The signature validation step, which would normally but not necessarily be carried out by the Authentication Center, comprises decrypting the message digest appended to the document, re-hashing the document to generate another message digest, and comparing the resulting message digest to the decrypted message digest. The public signature/verification key found in the certificate signed by the Certification Authority and appended to the document is used for decrypting the appended message digest. If the two message digest values agree, the identity of the individual named in the certificate can be asserted as the signatory of the document, or other information object, and the integrity of the document is confirmed and guaranteed. An Authentication Center attests to this result by itself digitally signing the document.

Figure 11:
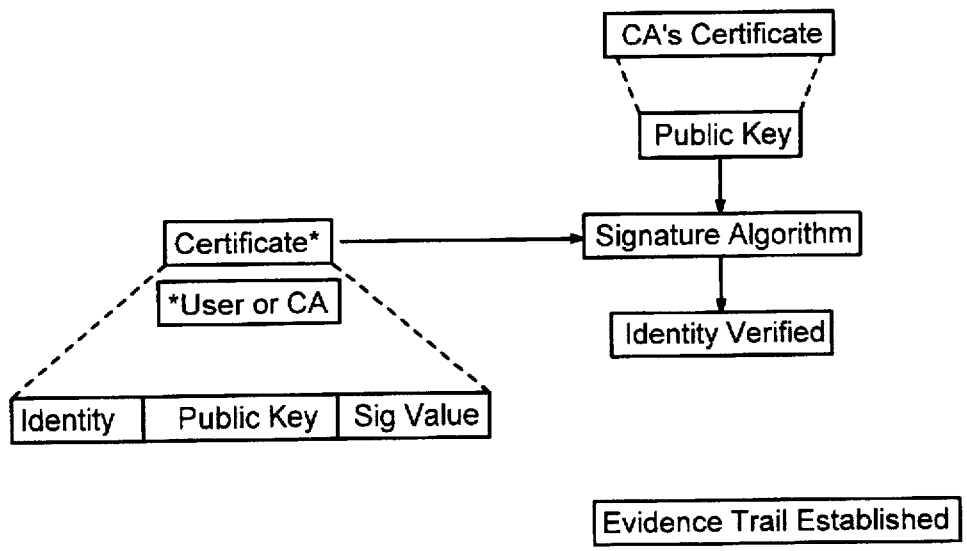
FIG. 11 illustrates validation of certificates.

As shown in FIG. 11, a certificate of a user (Transfer Agent) or even of a Certification Authority is preferably digitally signed in substantially the same way that electronic documents are digitally signed, except that such a certificate is signed by authorities specifically empowered to create certificates. Validation of a document's digital signatures includes validation of the public signatures of all Certification Authorities in a path between the signatory and a Root Authority, which is the most superior Certification Authority. The signatures of these Certification Authorities are loaded in the signatory's Token and appended to documents prepared with that Token.

Figure 12:
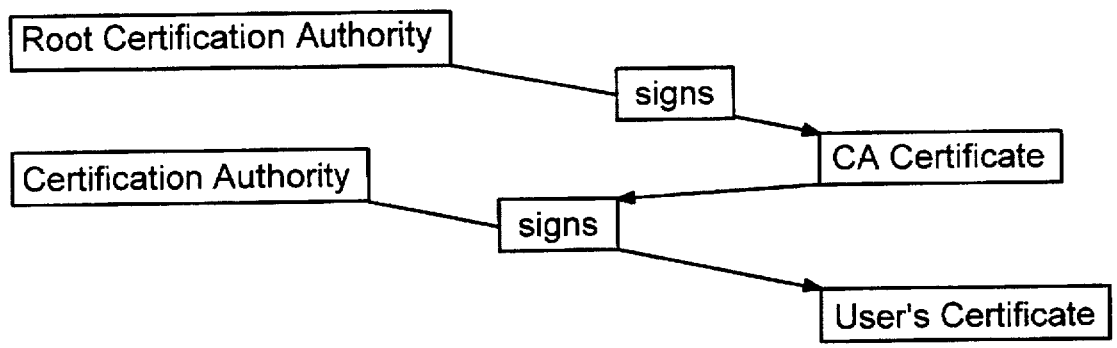
FIG. 12 illustrates generation of certificates.

As illustrated by FIG. 12, the path from the signatory to the Root Authority may be considered part of an authentication tree. The signatory's (user's) certificate is digitally signed by a Certification Authority whose own certificate (the CA Certificate) is signed by the Root Certification Authority. Since there is likely to be a plurality of Certification Authorities located on different branches of the authentication tree, it is only necessary to retrieve all Certification Authority certificates along both branches until a common node is encountered, in order to authenticate a digital signature for an entity on a different branch of an authentication tree, and to verify the authenticities of the certificates up to the common node.

It will be noted that the present description and drawings are illustrative only and that one of ordinary skill in the art would recognize that various modifications could be made without departing from the spirit or scope of the present invention which is to be limited only by the following claims.

What is claimed is:

1. A method of authenticating an electronic document, comprising the steps of:

signing the electronic document with a digital signature of a transfer agent;

appending a certificate to the electronic document by the transfer agent, wherein the certificate relates a cryptographic key to an identity of the transfer agent;

applying a date stamp and a time stamp to the electronic document;

validating the digital signature and certificate of the transfer agent;

signing the electronic document with a second digital signature and appending a second certificate to the electronic document signed with the second digital signature after the digital signature has been validated, wherein the second certificate relates a cryptographic key to the second digital signature; and storing in a facility identified by the second digital signature, the document signed with the second digital signature and having the second certificate appended such that the facility assumes control of the document.

2. An apparatus for authenticating an electronic document, comprising:

means for signing the electronic document with a digital signature of a transfer agent;

means for appending a certificate to the electronic document, wherein the certificate relates a cryptographic key to an identity of the transfer agent;

means for applying a date stamp and a time stamp to the electronic document;

means for validating the digital signature and certificate;

means for signing the electronic document with a second digital signature and for appending a second certificate to the electronic document signed with the second digital signature after the digital signature has been validated by the validating means, wherein the second certificate relates a cryptographic key to the second digital signature; and means, identified by the second digital signature, for storing the document signed with the second digital signature and having the second certificate appended such that the storing means assumes control of the document.

3. A method of executing a transaction by transferring an authenticated information object having a verifiable evidence trail, comprising the steps of:

signing, by a first entity, the information object with a first digital signature;

appending, by the first entity, a first certificate to the information object, wherein the first certificate relates at least an identity and a cryptographic key to the first entity;

authenticating the information object signed with the first digital signature and having appended the first certificate by a second entity, thereby forming an authenticated object, wherein the step of authenticating comprises:

validating the first digital signature and first certificate;

applying a date stamp and a time stamp to the information object signed with the first digital signature and having appended the first certificate; and after the validating and applying steps, taking control of the validated stamped information object by signing the information object with a second digital signature of the second entity, appending a second certificate to the information object, and storing the validated stamped information object signed with the second digital signature and having the second certificate appended as the authenticated object, wherein the second certificate relates at least an identity and a cryptographic key to the second entity; and transferring the authenticated object to an entity in response to an instruction.

4. The method of claim 3, wherein the transferring step comprises retrieving the stored authenticated object and providing the retrieved authenticated object to the entity in accordance with the instruction.

5. The method of claim 4, wherein the retrieved authenticated object is provided to each of a plurality of entities in accordance with the instruction.

6. The method of claim 3, wherein each signing step comprises the steps of applying a hash function to the information object to determine a message digest and using the message digest with a secret cryptographic key of the respective one of the first and second entities to determine the respective digital signature.

7. The method of claim 6, wherein the validating step comprises the step of using the digital signature with a public cryptographic key of the first entity, and with another message digest determined by applying the hash function to the information object.

8. The method of claim 3, further comprising the step of maintaining a log relating to the authenticated object so as to identify at least one subsequent information object related to the transaction.

9. The method of claim 8, wherein a subsequent information object is signed by a third digital signature of a third entity.

10. An apparatus for executing a transaction by transferring an authenticated information object having a verifiable evidence trail, comprising:

first means for signing, by a first entity, the information object with a first digital signature and for appending, by the first entity, a first certificate to the information object, wherein the first certificate relates at least an identity and a cryptographic key to the first entity; and means for authenticating an information object signed with the first digital signature and having appended the first certificate by a second entity, thereby forming an authenticated object, wherein the authenticating means comprises:

means for validating the first digital signature and first certificate;

a date stamp and a time stamp for application to an information object signed with the first digital signature and having appended the first certificate; and means for controlling a validated stamped information object, wherein the controlling means comprises second means for signing an information object with a second digital signature of the second entity and for appending a second certificate to the information object, and a memory;

wherein the memory includes storage locations for validated stamped information objects signed with the second digital signature and having the second certificate appended as authenticated objects, an authenticated object stored in the memory is transferrable in response to an instruction, and the second certificate relates at least an identity and a cryptographic key to the second entity.

11. The apparatus of claim 10, wherein each signing means comprises a processor for applying a hash function to the information object to determine a message digest and for using the message digest with a secret cryptographic key of the respective one of the first and second entities to determine the respective digital signature.

12. The apparatus of claim 11, wherein the signing means is an electronic circuit card.

13. The apparatus of claim 11, wherein the validating means comprises a processor for using the digital signature with a public cryptographic key of the first entity, and with another message digest determined by applying the hash function to the information object.

14. The apparatus of claim 10, wherein an authenticated object is transferred in response to the instruction by retrieving the authenticated object from the memory a plurality of times and providing the retrieved authenticated objects to a plurality of entities.

15. The apparatus of claim 10, wherein the authenticating means further comprises a log relating to authenticated objects and identifying at least one subsequent information object related to the transaction and stored in the memory.

16. The apparatus of claim 15, wherein a subsequent information object is signed by a third digital signature of a third entity.

* * * * *